United States Patent
Parulkar et al.

(10) Patent No.: US 10,111,189 B2
(45) Date of Patent: Oct. 23, 2018

(54) ENHANCED PHASE SYNCHRONIZATION OF A TIMING SLAVE APPARATUS IN A PACKET SWITCHING NETWORK

(71) Applicants: Ishwardutt Parulkar, San Francisco, CA (US); Karuppusamy Marappagounder, Karnataka (IN); Manoj I. Somakumaran, Karnataka (IN)

(72) Inventors: Ishwardutt Parulkar, San Francisco, CA (US); Karuppusamy Marappagounder, Karnataka (IN); Manoj I. Somakumaran, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 315 days.

(21) Appl. No.: 14/860,181

(22) Filed: Sep. 21, 2015

(65) Prior Publication Data
US 2017/0034797 A1    Feb. 2, 2017

(30) Foreign Application Priority Data
Jul. 30, 2015  (IN) .......................... 3929/CHE/2015

(51) Int. Cl.
*H04W 56/00*    (2009.01)
(52) U.S. Cl.
CPC ................... *H04W 56/001* (2013.01)
(58) Field of Classification Search
None
See application file for complete search history.

(56) References Cited

U.S. PATENT DOCUMENTS

| 2009/0147806 A1* | 6/2009 | Brueckheimer | H04J 3/0667 |
|---|---|---|---|
| | | | 370/503 |
| 2010/0118894 A1* | 5/2010 | Aweya | G06F 1/0328 |
| | | | 370/503 |

(Continued)

OTHER PUBLICATIONS

Mills et al., "Network Time Protocol Version 4: Protocol and Algorithms Specification," Jun. 2010, RFC 5905, The Internet Society, Reston, VA (110 pages).

(Continued)

*Primary Examiner* — Noel R Beharry
*Assistant Examiner* — Ruihua Zhang
(74) *Attorney, Agent, or Firm* — The Law Office of Kirk D. Williams

(57) ABSTRACT

In one embodiment, a timing slave packet switching device receives a received primary reference clock signal. The timing slave packet switching device communicates a first plurality of packet network synchronization packets over a packet switching network with a remote primary reference clock source and derives an over-network clock based on the first plurality of packet network synchronization packets. A phase offset between the phase of the over-network clock and the phase of the received primary reference clock signal is determined and typically stored in non-volatile storage. Subsequent to said determining the phase offset, the timing slave packet switching device communicates a second plurality of packet network synchronization packets over the packet switching network with the remote primary reference clock source and adjusts the phase of a clock derived from the second plurality of packet network synchronization packets based on the phase offset.

20 Claims, 5 Drawing Sheets

(56) References Cited

U.S. PATENT DOCUMENTS

2011/0200051 A1  8/2011 Rivaud et al.
2014/0351359 A1* 11/2014 Grocutt .................... G06F 1/12
                                                            709/209

OTHER PUBLICATIONS

"IEEE 1588 Precision Time Protocol —Frequency Synchronization Over Packet Networks," Feb. 20, 2008, Symmetricon Inc., San Jose, CA (8 pages).
Tim Frost, "The PTP Telecom Profiles for Frequency, Phase and Time Synchronization," May 2013, Symmetricom, Inc. San Jose, CA (30 pages).
Peter Gaspar, "Frequency and Time Synchronization in Packet Based Networks," 2010, Cisco Systems, Inc., San Jose, CA (79 pages).

* cited by examiner

ENHANCED PHASE SYNCHRONIZATION OF A TIMING SLAVE APPARATUS IN A PACKET SWITCHING NETWORK

TECHNICAL FIELD

The present disclosure relates generally to communications networks including packet switching devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. In some networks, some packet switching devices have synchronized clocks.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1:
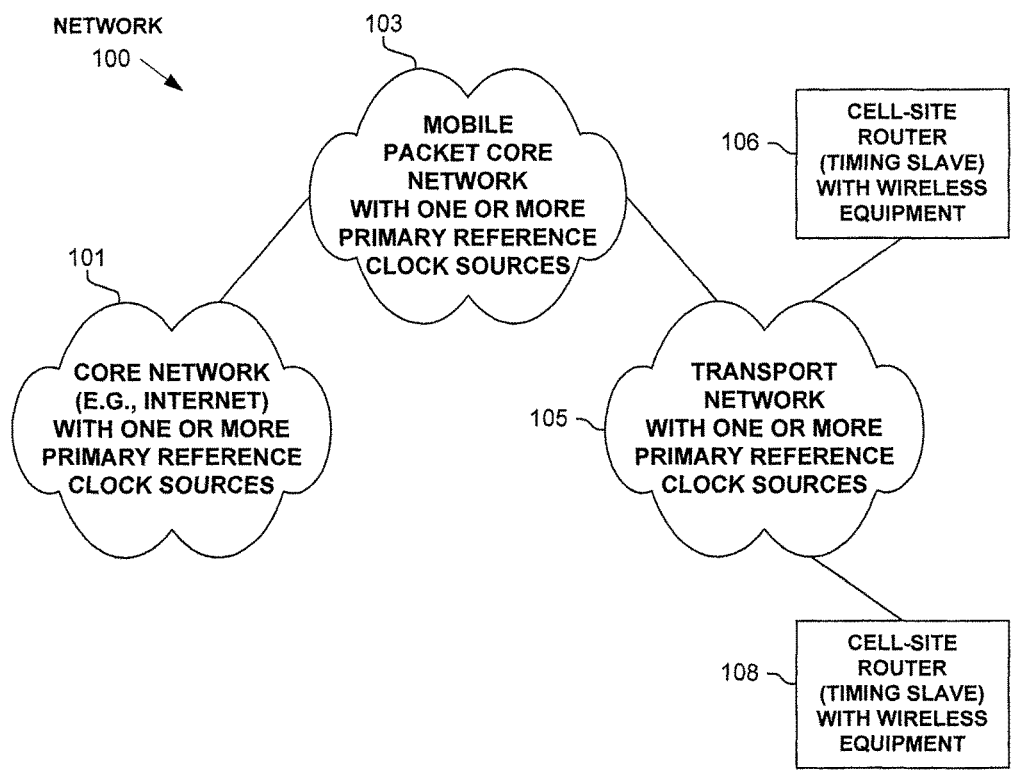
FIG. 1 illustrates a network operating according to one embodiment.

Disclosed are, inter alia, methods, apparatus, computer-storage media, mechanisms, and means associated with enhanced phase synchronization of a timing slave apparatus in a packet switching network. One embodiment includes a method, comprising: receiving, by a timing slave packet switching device, a received primary reference clock signal; communicating a first plurality of packet network synchronization packets by the timing slave packet switching device over a packet switching network with a remote primary reference clock source and deriving an over-network clock based on the first plurality of packet network synchronization packets; determining a phase offset between the phase of the over-network clock and the phase of the received primary reference clock signal; and subsequent to determining the phase offset, and communicating a second plurality of packet network synchronization packets by the timing slave packet switching device over the packet switching network with the remote primary reference clock source and adjusting the phase of a clock derived from the second plurality of packet network synchronization packets based on the phase offset. In one embodiment, the timing slave packet switching device communicates information based on the phase adjusted clock derived from the second plurality of packet network synchronization packets.

One embodiment includes an apparatus, comprising: one or more processors elements; memory; a clock; and a plurality of interfaces configured to send and receive packets, including communicating a first plurality of packet network synchronization packets by the timing slave packet switching device over a packet switching network with a remote primary reference clock source and deriving an over-network clock based on the first plurality of packet network synchronization packets. In one embodiment, the apparatus is configured to determine a phase offset between the phase of the over-network clock and the phase of a received primary reference clock signal; and configured to, subsequent to determining the phase offset, communicate a second plurality of packet network synchronization packets by the apparatus over the packet switching network with the remote primary reference clock source to set a frequency of the clock and adjusting the phase of the clock based on the phase offset. In one embodiment, the apparatus is configured to communicate information from one or more of the plurality of interfaces based on the clock after adjusting the phase of the clock based on the phase offset.

One embodiment includes a method, comprising: receiving, by a timing slave packet switching device, a received primary reference clock signal; communicating a first plurality of packet network synchronization packets by the timing slave packet switching device over a first path through a packet switching network with a first remote primary reference clock source and deriving a first over-network clock based on the first plurality of packet network synchronization packets; determining a first phase offset between the phase of the first over-network clock and the received primary reference clock signal; communicating a second plurality of packet network synchronization packets by the timing slave packet switching device over a second path through the packet switching network with the remote primary reference clock source or a different remote primary reference clock source and deriving a second over-network clock based on the second plurality of packet network synchronization packets; determining a second phase offset between the phase of the second over-network clock and the received primary reference clock signal; and subsequent to determining the first and second phase offsets, communicating a third plurality of packet network synchronization packets by the timing slave packet switching device over the first path through the packet switching network with the first remote primary reference clock source and adjusting the phase of a clock derived from the third plurality of packet network synchronization packets based on the first phase offset. One embodiment includes sending information based on the phase adjusted clock derived from the third plurality of packet network synchronization packets.

In one embodiment, subsequent to determining the first and second phase offsets, communicating a fourth plurality of packet network synchronization packets by the timing slave packet switching device over the second path through the packet switching network with the first remote primary reference clock source or the second remote primary reference clock source and adjusting the phase of a clock derived from the fourth plurality of packet network synchronization packets based on the second phase offset, and sending information based on the phase adjusted clock derived from the fourth plurality of packet network synchronization packets.

In one embodiment, the received primary reference clock signal is received using Global Positioning System (GPS) equipment internal to the timing slave packet switching device. In one embodiment, the received primary reference clock signal is received using Global Positioning System (GPS) equipment external to the timing slave packet switching device. In one embodiment, the GPS equipment is disconnected from the timing packet switching device after determining the phase offset and prior to communicating the second plurality of packet network synchronization packets. In one embodiment, the phase offset(s) are stored in non-volatile storage so that they can be used after a reboot or reinitialization.

2. Description

Disclosed are, inter alia, methods, apparatus, computer-storage media, mechanisms, and means associated with enhanced phase synchronization of a timing slave apparatus in a packet switching network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processor may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The term "route" is used to refer to a fully or partially expanded prefix (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

As used herein, a "remote" is used to denote that two devices are not directly connected, but rather, for example, have at least one intervening packet switching device in between (e.g., at least two hops away).

FIG. 1 illustrates a network 100 operating according to one embodiment. As shown, core network 101 (e.g., the Internet), mobile packet core network 103, transport network (e.g., backhaul network, access network) 105, and cell-site routers with wireless equipment 106 and 108 for communicating with wireless devices. In one embodiment, cell-site routers 106 and 108 have their clocks synchronized to a primary reference clock source, with can be located in network 101, 103, or 105, or elsewhere.

Each of IEEE 1588v2 Precision Time Protocol (PTP) and Network Time Protocol (NTP) provides a means of distributing timing synchronization (e.g., frequency, phase, and time) across timing slave apparatus, such as, but not limited to base stations (e.g., cell-site routers 106 and 108) at the edge of wireless network through asynchronous Ethernet networks (e.g., networks 101, 103, 105). For some wireless communication, PTP provided sufficient frequency accuracy. However, certain wireless communication requires a more accurate phase alignment than PTP can provide. For example, some wireless technologies require a phase accuracy of one microsecond in order to align time slots across wireless nodes, otherwise packet loss/collision and spectral inefficiency can result.

In one embodiment to increase the frequency accuracy of devices, each of the apparatus (e.g., cell-site routers 106 and 108) are initially phase-synchronized to one or more primary reference clock sources in network 100 for each path through network 100 between the corresponding primary reference clock source and the timing slave apparatus (e.g., cell-site router 106, 108).

Figure 2A:
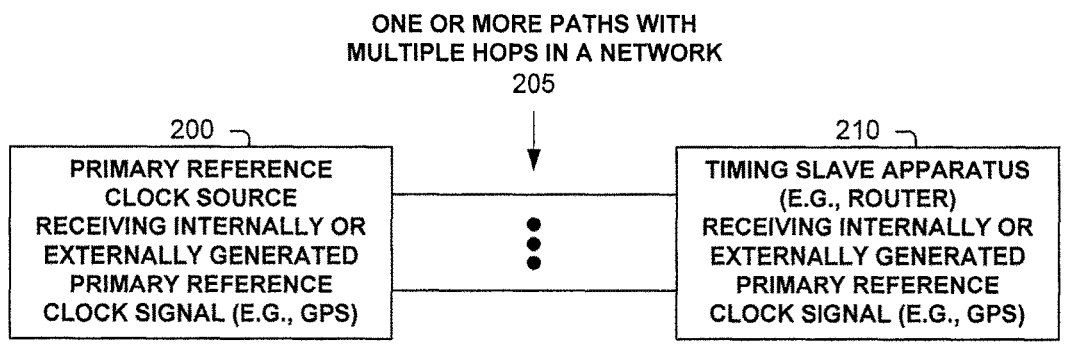
FIG. 2A illustrates a network operating according to one embodiment.
Figure 2B:
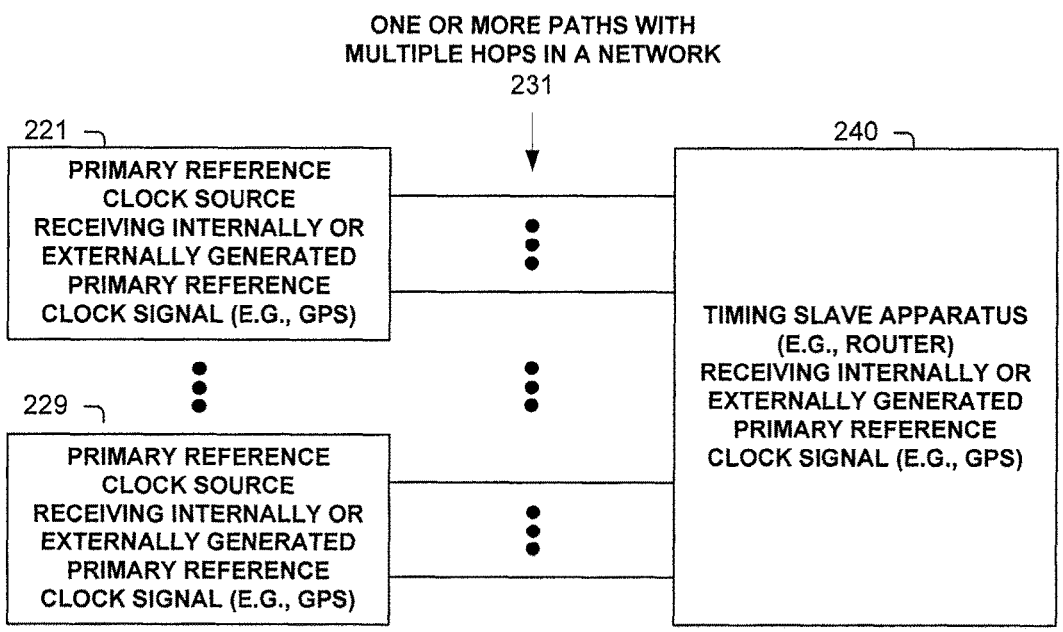
FIG. 2B illustrates a network operating according to one embodiment.

FIG. 2A illustrates one embodiment where a timing slave apparatus 210 is communicatively coupled via one or more paths 205 in a network to a primary reference clock source 200. FIG. 2B illustrates one embodiment where a timing slave apparatus 240 is communicatively coupled via one or more paths 231 in a network to each of multiple primary reference clock sources 221-229.

In one embodiment in calibrating the phase alignment of a time slave apparatus, both the primary reference clock source and the timing slave apparatus are directly connected (i.e., no network delay component) to a highly accurate timing source. In one embodiment, this timing source is a global navigation satellite system (GNSS), such that each of the primary reference clock source and the timing slave apparatus is directly connected to a global positioning satellite (GPS) receiver. There is other commercially available equipment that could be used instead to acquire the desired frequency accuracy between the primary reference clock source and the timing slave apparatus. A PTP session is also simultaneously established between the two devices. After a settling period (which could even be an hour or more), the phase difference between the two timing signals is measured at the timing slave apparatus using internal or external equipment. This phase difference is typically stored in non-volatile storage in the timing slave apparatus such that it is available after rebooting or reinitialization. In one embodiment, this phase difference is stored in a network management or other system and provided to the timing slave apparatus as needed. This procedure is repeated for each primary reference clock source/network path combination that the timing slave apparatus might use. Once completed, any external equipment is typically disconnected from the timing slave apparatus.

Subsequently, the timing slave apparatus acquires network timing using PTP, NTP or another protocol to set its over-network clock, and uses the corresponding stored phase difference to adjust the phase (e.g., as an input to the servo system) of the over-network clock. In one embodiment, the servo system is in the timing slave and filters packet network synchronization packets to determine the adjustment to be applied to the crystal oscillator frequency in the timing slave and to derive its local clock In response to a change in the path between the primary reference clock source and timing slave apparatus or a switch to a different primary reference clock source, the timing slave apparatus acquires the corresponding phase difference and uses that value to adjust the phase of the over-network clock corresponding to the new primary reference clock source/network path combination.

Figure 3A:
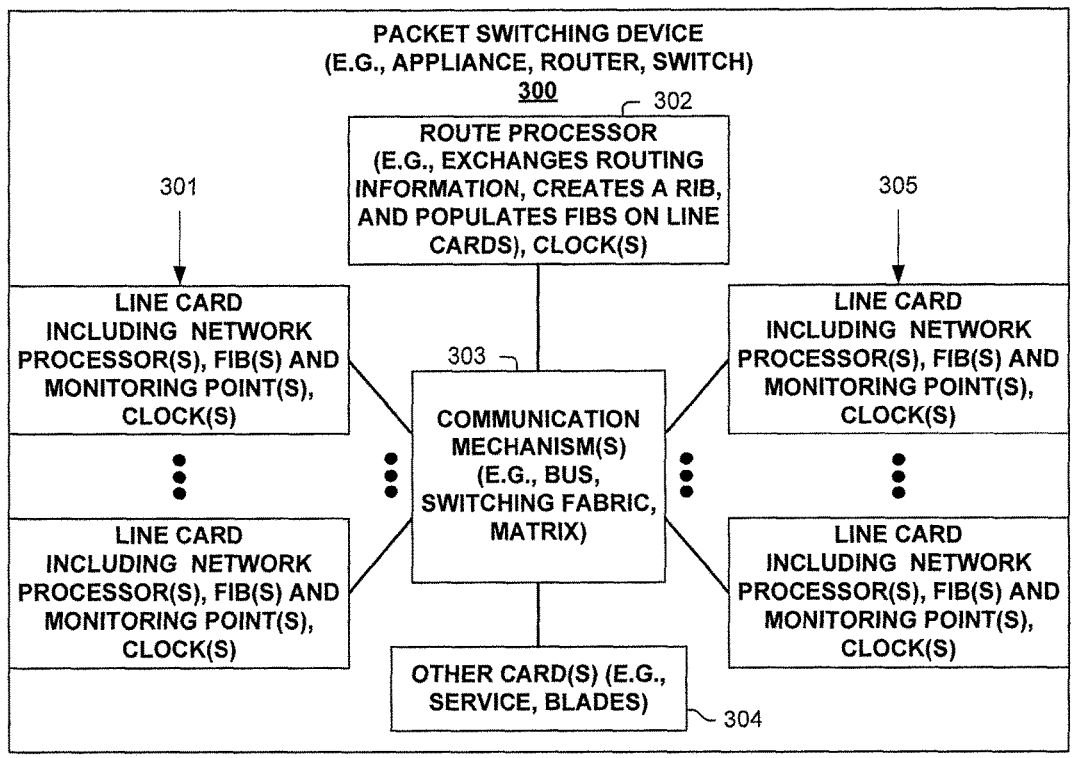
FIG. 3A illustrates a packet switching device according to one embodiment.

One embodiment of a packet switching device 300 with one or more clocks is illustrated in FIG. 3A. As shown, packet switching device 300 includes multiple line cards 301 and 305, each with one or more network interfaces for sending and receiving packets over communications links (e.g., including sending and receiving packet network synchronization packets in order to acquire over-network timing), one or more clocks, and with one or more processors that are used in one embodiment associated with enhanced phase synchronization of a timing slave apparatus in a packet switching network. Packet switching device 300 also has a control plane with one or more processors 302 for managing the control plane and/or control plane processing of packets and possibly one or more clocks associated with enhanced phase synchronization of a timing slave apparatus in a packet switching network. Packet switching device 300 also includes other cards 304 (e.g., service cards, blades) which typically include clocks and processors that are used in one embodiment to process packets, and some communication mechanism 303 (e.g., bus, switching fabric, matrix) for allowing its different entities 301, 302, 304 and 305 to communicate.

Line cards 301 and 305 typically perform the actions of being both an ingress and egress line card, in regards to multiple other particular packets and/or packet streams being received by, or sent from, packet switching device 300. In one embodiment, line cards 301 and/or 305 use command message generation and execution using a machine code-instruction to perform prefix or other address matching on forwarding information bases (FIBs) to determine how to ingress and/or egress process packets. Even though the term FIB includes the word "forwarding," this information base typically includes other information describing how to process corresponding packets.

Figure 3B:
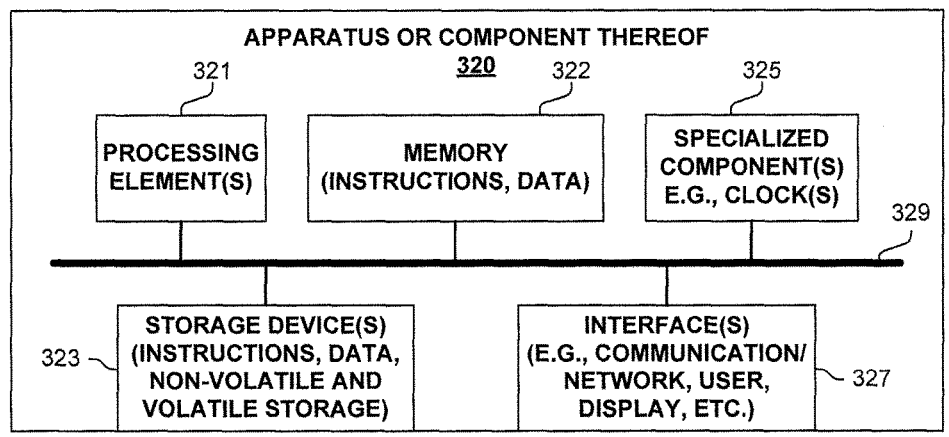
FIG. 3B illustrates an apparatus according to one embodiment.

FIG. 3B is a block diagram of an apparatus 320 used in one embodiment associated with enhanced phase synchronization of a timing slave apparatus in a packet switching network. In one embodiment, apparatus 320 performs one or more processes, or portions thereof, corresponding to one of the flow diagrams illustrated or otherwise described herein, and/or illustrated in another diagram or otherwise described herein. In one embodiment, these processes are performed in one or more threads on one or more processors.

In one embodiment, apparatus 320 includes one or more processor(s) 321 (typically with on-chip memory), memory 322, storage device(s) 323, specialized component(s) 325 (e.g., clocks, ternary content-addressable memory(ies) such as for performing flow identification packet processing operations, flow monitoring, etc.), and interface(s) 327 for communicating information (e.g., sending and receiving packets, user-interfaces, displaying information, etc.), which are typically communicatively coupled via one or more communications mechanisms 329 (e.g., bus, links, switching fabric, matrix), with the communications paths typically tailored to meet the needs of a particular application.

Various embodiments of apparatus 320 may include more or fewer elements. The operation of apparatus 320 is typically controlled by processor(s) 321 using memory 322 and storage device(s) 323 to perform one or more tasks or processes. Memory 322 is one type of computer-readable/computer-storage medium, and typically comprises random access memory (RAM), read only memory (ROM), flash memory, integrated circuits, and/or other memory components. Memory 322 typically stores computer-executable instructions to be executed by processor(s) 321 and/or data which is manipulated by processor(s) 321 for implementing functionality in accordance with an embodiment. Storage device(s) 323 are another type of computer-readable medium, and typically comprise non-volatile storage, solid state storage media, disk drives, diskettes, networked services, tape drives, and other storage devices. Storage device(s) 323 typically store computer-executable instructions to be executed by processor(s) 321 and/or data which is manipulated by processor(s) 321 for implementing functionality in accordance with an embodiment.

Figure 4:
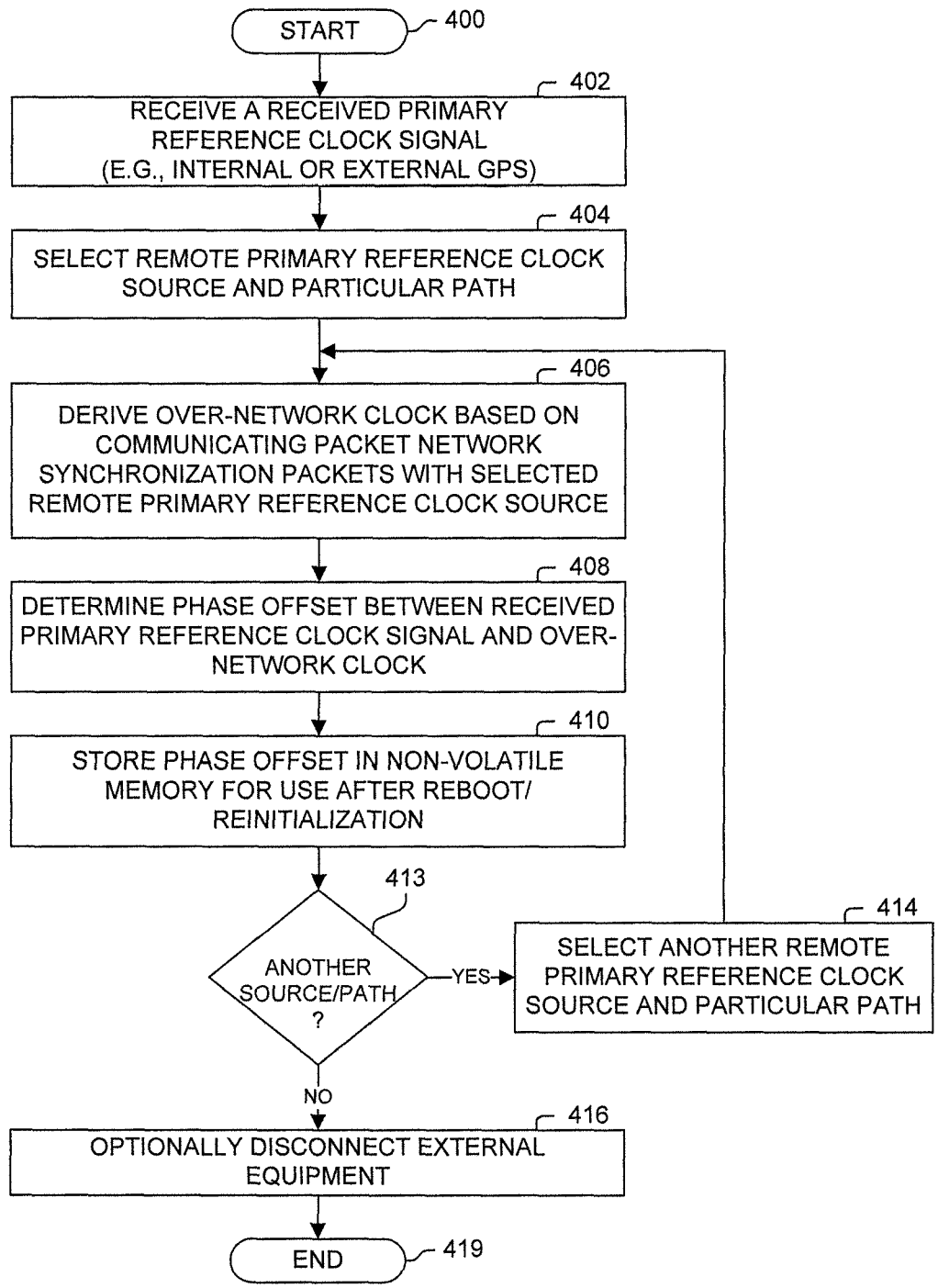
FIG. 4 illustrates a process according to one embodiment.

FIG. 4 illustrates a process performed in one embodiment by a timing slave apparatus in a network. Processing begins with process block 400. In process block 402, a received primary reference clock signal is directly received by the timing slave apparatus (e.g., using a GPS receiver or other available timing equipment, which could be external to or built into the timing slave apparatus). In one embodiment, this signal is not directly received but that embodiment typically has a decreased phase alignment accuracy. In process block 404, a remote primary reference clock source and path between it and the timing slave apparatus is selected.

In process block 406, the timing slave apparatus and the selected remote primary reference clock source communicate packet network synchronization packets (e.g., PTP or NTP packets) over this selected path, and the timing slave apparatus sets an over-network clock based thereon. In process block 408, the phase offset is determined between the received primary reference clock signal and the over-network clock. In process block 410, this phase offset is stored typically in non-volatile memory for use including after rebooting or reinitialization.

As determined in process block 413, if there is another remote primary reference clock source and path combination to be calibrated, then process block 414 is performed; otherwise, process block 416 is performed. In process block 414, a next remote primary reference clock source and path combination is selected for calibration and processing returns to process block 406. After all desired reference clock source and path combinations have been calibrated as determined in process block 413, then any external equipment is typically disconnected in process block 416. Processing of the flow diagram of FIG. 4 is complete as indicated by process block 419.

Figure 5:
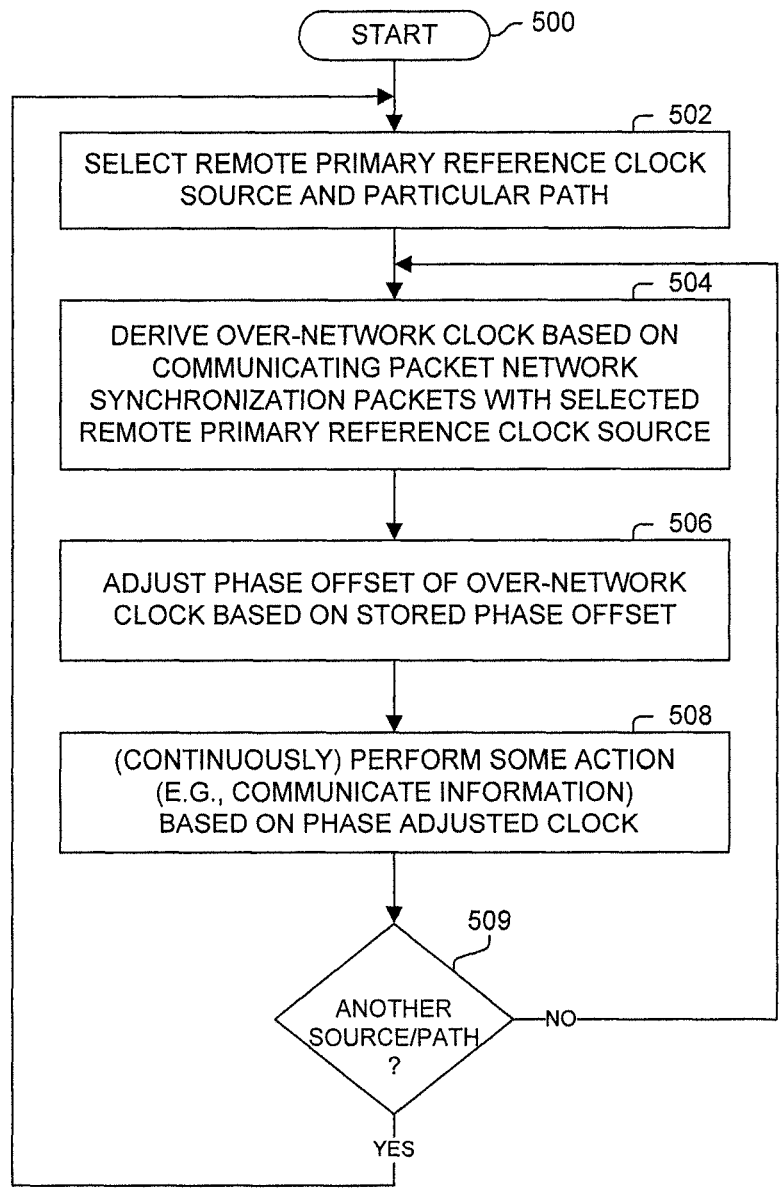
FIG. 5 illustrates a process according to one embodiment.

FIG. 5 illustrates a process performed in one embodiment by a timing slave apparatus after the phase calibration process has been performed such as, but not limited to, that described in relation to FIG. 4.

Processing of the flow diagram of FIG. 5 begins with process block 500. In process block 502, a remote primary reference clock source and path between it and the timing slave apparatus is selected. In process block 504, an over-network clock is derived based on packet network synchronization packets (e.g., PTP or NTP packets) communicated (e.g., sent and/or received packets) over the packet network between the timing slave apparatus and the remote primary reference clock source over the particular path. In process block 506, the corresponding previously determined phase offset is used to adjust the phase of the over-network clock (e.g., is an input to the servo system of the timing slave apparatus). In process block 508, the timing slave apparatus performs, typically continuously, some action based on the phase adjusted clock. In one embodiment, this action includes, but is not limited to, communicating information (e.g., sending and/or receiving packets or other formats of data with wireless devices).

As determined in process block 509, when there is no change in the remote primary reference clock source/particular path combination, then processing returns to process block 504 to continue acquiring network timing from the selected remote primary reference clock source and over the particular path and adjust its phase accordingly. As determined in process block 509, when there is a change in the remote primary reference clock source/particular path combination, then processing proceeds to process block 502 to acquire network timing and adjust its phase accordingly.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
receiving, by a timing slave packet switching device, a received primary reference clock signal;
determining, by the timing slave packet switching device, a first phase offset between the phases of the received primary reference clock signal and a first over-network clock derived by the timing slave packet switching device based on a first plurality of packet network synchronization packets communicated with a first remote primary reference clock source over a first path in a packet switching network;
determining, by the timing slave packet switching device, a second phase offset between the phases of the received primary reference clock signal and a second over-network clock derived by the timing slave packet switching device based on a second plurality of packet network synchronization packets communicated with the first or a second remote primary reference clock source over a second path in the packet switching network;
establishing, by the timing slave packet switching device, a first phase adjusted clock derived from a third plurality of packet network synchronization packets communicated with the first remote primary reference clock over the first path and phase adjusted based on the first phase offset;
establishing, by the timing slave packet switching device, a second phase adjusted clock derived from a fourth plurality of packet network synchronization packets communicated with the first or second remote primary reference clock over the second path and phase adjusted based on the second phase offset;
communicating, by the timing slave packet switching device, information based on the first phase adjusted clock; and
switching, by the timing slave packet switching device, said communicating information based on the first phase adjusted clock to communicating information based on the second phase adjusted clock.

2. The method of claim 1, wherein the received primary reference clock signal is received using Global Positioning System (GPS) equipment internal to the timing slave packet switching device.

3. The method of claim 1, wherein the received primary reference clock signal is received using Global Positioning System (GPS) equipment external to the timing slave packet switching device.

4. The method of claim 3, wherein the GPS equipment is disconnected from the timing slave packet switching device after said determining the first phase offset and prior to said establishing the first phase adjusted clock.

5. The method of claim 1, comprising after said determining the first phase offset and prior to said establishing the first phase adjusted clock: storing the first phase offset in non-volatile storage in the timing slave packet switching device and rebooting or reinitializing the timing slave packet switching device.

6. The method of claim 1, comprising:
storing the first phase offset in non-volatile storage in the timing slave packet switching device; and subsequent to said storing the first phase offset, rebooting or reinitializing the timing slave packet switching device and then said establishing the first phase adjusted clock.

7. The method of claim 1, wherein the timing slave packet switching device is a cell-site router; and wherein each of said first and second phase adjusted clocks is used in communicating packets with wireless devices.

8. The method of claim 1, wherein the first remote primary reference clock source is at least three hops away from the timing slave packet switching device.

9. The method of claim 1, wherein each of said determining the first and second phase offsets uses a second clock, maintained by the timing slave packet switching device, based on the received primary reference clock signal.

10. A method, comprising:
receiving, by a timing slave packet switching device, a received primary reference clock signal;
communicating a first plurality of packet network synchronization packets by the timing slave packet switching device over a first path through a packet switching network with a first remote primary reference clock source and deriving a first over-network clock based on the first plurality of packet network synchronization packets;
determining a first phase offset between the phase of the first over-network clock and the received primary reference clock signal;
communicating a second plurality of packet network synchronization packets by the timing slave packet switching device over a second path through the packet switching network with the first remote primary reference clock source or a different remote primary reference clock source and deriving a second over-network clock based on the second plurality of packet network synchronization packets;
determining a second phase offset between the phase of the second over-network clock and the received primary reference clock signal;
subsequent to said determining the first and second phase offsets, communicating a third plurality of packet network synchronization packets by the timing slave packet switching device over the first path through the packet switching network with the first remote primary reference clock source and adjusting the phase of a clock derived from the third plurality of packet network synchronization packets based on the first phase offset;
sending, by the timing slave packet switching device, information based on said phase adjusted clock derived from the third plurality of packet network synchronization packets;
subsequent to said determining the first and second phase offsets, communicating a fourth plurality of packet network synchronization packets by the timing slave packet switching device over the second path through the packet switching network with the first remote primary reference clock source or the different remote primary reference clock source and adjusting the phase of a clock derived from the fourth plurality of packet network synchronization packets based on the second phase offset; and
switching, by the timing slave packet switching device, said sending information based on said phase adjusted clock derived from the third plurality of packet network synchronization packets to sending information based on said phase adjusted clock derived from the fourth plurality of packet network synchronization packets.

11. The method of claim 10, wherein said switching is performed in response to a network error condition effecting said communicating the third plurality of packet network synchronization packets over the first path through the packet switching network.

12. The method of claim 10, wherein the second plurality of packet network synchronization packets are communicated with the first remote primary reference clock source.

13. The method of claim 10, wherein the second plurality of packet network synchronization packets are communicated with the different remote primary reference clock source.

14. The method of claim 10, wherein the received primary reference clock signal is received using Global Positioning System (GPS) equipment external to the timing slave packet switching device.

15. The method of claim 14, wherein the external GPS equipment is disconnected from the timing packet switching device after said determining the first phase offset and prior to said communicating the third plurality of packet network synchronization packets.

16. The method of claim 10, comprising after said determining the first and second phase offsets and prior to said communicating the third plurality of packet network synchronization packets: storing the first and second phase offsets in non-volatile storage in the timing slave packet switching device and rebooting or reinitializing the timing slave packet switching device.

17. An apparatus, comprising:
one or more processors elements;
memory;
a clock; and
a plurality of interfaces communicatively coupled to a packet switching network;
wherein the apparatus performs operations, including:
receiving a received primary reference clock signal;
communicating a first plurality of packet network synchronization packets over a first path through the packet switching network with a first remote primary reference clock source and deriving a first over-network clock based on the first plurality of packet network synchronization packets;
determining a first phase offset between the phase of the first over-network clock and the received primary reference clock signal;
communicating a second plurality of packet network synchronization packets over a second path through the packet switching network with the first remote primary reference clock source or a different remote primary reference clock source and deriving a second over-network clock based on the second plurality of packet network synchronization packets;
determining a second phase offset between the phase of the second over-network clock and the received primary reference clock signal;
subsequent to said determining the first and second phase offsets, communicating a third plurality of packet network synchronization packets over the first path through the packet switching network with the first remote primary reference clock source and adjusting the phase of a clock derived from the third plurality of packet network synchronization packets based on the first phase offset;

sending information based on said phase adjusted clock derived from the third plurality of packet network synchronization packets;

subsequent to said determining the first and second phase offsets, communicating a fourth plurality of packet network synchronization packets over the second path through the packet switching network with the first remote primary reference clock source or the different remote primary reference clock source and adjusting the phase of a clock derived from the fourth plurality of packet network synchronization packets based on the second phase offset; and switching said sending information based on said phase adjusted clock derived from the third plurality of packet network synchronization packets to sending information based on said phase adjusted clock derived from the fourth plurality of packet network synchronization packets.

18. The apparatus of claim 17, wherein the received primary reference clock signal is received using Global Positioning System (GPS) equipment external to the timing slave packet switching device.

19. The apparatus of claim 18, wherein the external GPS equipment is disconnected from the timing packet switching device after said determining the first phase offset and prior to said communicating the third plurality of packet network synchronization packets.

20. The apparatus of claim 17, wherein after said determining the first and second phase offsets and prior to said communicating the third plurality of packet network synchronization packets: the apparatus stores the first and second phase offsets in non-volatile storage in the timing slave packet switching device and rebooting or reinitializing the timing slave packet switching device.

* * * * *